US010296933B2

United States Patent
Gottesman et al.

(10) Patent No.: US 10,296,933 B2
(45) Date of Patent: May 21, 2019

(54) IDENTIFYING CONTENT IN ELECTRONIC IMAGES

(71) Applicant: Facebook, Inc., Menlo Park, CA (US)

(72) Inventors: Frederick Gottesman, Austin, TX (US); David Clune, Austin, TX (US); James Andrews, Bellaire, TX (US); Igor Gevka, Palo Alto, CA (US); Satwik Shukla, Austin, TX (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/862,212

(22) Filed: Apr. 12, 2013

(65) Prior Publication Data

US 2014/0306986 A1  Oct. 16, 2014

(51) Int. Cl.
*G06Q 30/02* (2012.01)
*G06K 9/00* (2006.01)

(52) U.S. Cl.
CPC ..... *G06Q 30/0241* (2013.01); *G06K 9/00456* (2013.01)

(58) Field of Classification Search
CPC ........ G06Q 30/00; G06Q 50/01; G06F 17/21; G06F 17/211–17/218; G06F 17/30899–17/30905; G09G 2340/00; G09G 2340/12; G09G 2340/14; G09G 2340/145; G06T 1/00
USPC ......................... 345/629–636; 382/173, 176; 709/204–207; 715/243–253
See application file for complete search history.

(56) References Cited

U.S. PATENT DOCUMENTS

| 7,203,360 B2 * | 4/2007 | Lee et al. ........................ 382/173 |
| 7,930,647 B2 * | 4/2011 | Skrenta ............. G06F 17/30056 707/748 |
| 8,655,716 B1 * | 2/2014 | Barnes ............... G06Q 30/0241 705/14.49 |
| 8,818,913 B1 * | 8/2014 | Meyer .................... G06Q 10/10 705/1.1 |
| 2004/0004641 A1 | 1/2004 | Gargi |
| 2004/0202368 A1 | 10/2004 | Lee et al. |
| 2006/0103667 A1 * | 5/2006 | Amit ..................... G06F 17/211 345/619 |

(Continued)

FOREIGN PATENT DOCUMENTS

| CN | 101419661 A | 4/2009 |
| CN | 102947851 A | 2/2013 |

(Continued)

OTHER PUBLICATIONS

Laura Holloway, The Little Graphic that Could: Overcoming Facebook's 20% Rule, Mar. 2013, retrieved from <<https://www.verticalmeasures.com/blog/ppc-advertising/the-little-graphic-that-could-overcoming-facebooks-20-percent-rule/>>, Accessed Sep. 17, 2018 (Year: 2013).*

(Continued)

*Primary Examiner* — Michael J Cobb
(74) *Attorney, Agent, or Firm* — Baker Botts L.L.P.

(57) ABSTRACT

Particular embodiments may access an electronic image including a surface area and divide the electronic image into a plurality of surfaces. Particular embodiments may then determine that one or more of the surfaces include a type of graphics and determine a percentage of the surface area of the image that is occupied by the one or more surfaces determined to include the type of graphics.

15 Claims, 4 Drawing Sheets

(56) References Cited

U.S. PATENT DOCUMENTS

| | | | |
|---|---|---|---|
| 2007/0027749 A1* | 2/2007 | Peiro | G06Q 30/0241 705/14.4 |
| 2008/0231751 A1* | 9/2008 | Zalewski | 348/578 |
| 2008/0260248 A1* | 10/2008 | Kondo et al. | 382/173 |
| 2009/0110287 A1 | 4/2009 | Bates | |
| 2009/0150210 A1* | 6/2009 | Athsani et al. | 705/10 |
| 2009/0171920 A1* | 7/2009 | Wade | G06F 17/30864 |
| 2010/0074526 A1 | 3/2010 | Campbell | |
| 2010/0100811 A1* | 4/2010 | Ishiguro | G06F 17/211 715/243 |
| 2010/0157340 A1* | 6/2010 | Chen et al. | 358/1.9 |
| 2011/0010661 A1* | 1/2011 | Wade et al. | 715/803 |
| 2011/0091098 A1* | 4/2011 | Yuille et al. | 382/159 |
| 2011/0113323 A1 | 5/2011 | Fillion | |
| 2011/0302510 A1* | 12/2011 | Harrison et al. | 715/781 |
| 2011/0302524 A1* | 12/2011 | Forstall | 715/781 |
| 2011/0321084 A1* | 12/2011 | Takahashi et al. | 725/32 |
| 2012/0159307 A1* | 6/2012 | Chung | G06F 17/30905 715/234 |
| 2013/0058575 A1* | 3/2013 | Koo et al. | 382/176 |
| 2013/0069924 A1* | 3/2013 | Robinson et al. | 345/207 |
| 2014/0289614 A1* | 9/2014 | Ayers | 715/247 |

FOREIGN PATENT DOCUMENTS

| | | |
|---|---|---|
| JP | H 06208625 A | 7/1994 |
| JP | 2007-081699 A | 3/2007 |
| JP | 2009-296140 A | 12/2009 |
| KR | 10-2012-0132125 | 12/2012 |

OTHER PUBLICATIONS

Cas McCullough, Are You Put Off by Facebook's ambiguous 20 percent ad-text Policy?, Feb. 2013, retrieved from <<http://casmccullough.com/are-you-put-off-by-facebooks-ambiguous-20-percent-ad-text-policy/>>, Accessed Sep. 16, 2018 (Year: 2013).*

Adam Rosenberg, Does Your Content Play by Facebook's New 20 Percent Rule?, Jan. 2013, retrieved from <<https://www.socialfresh.com/facebook-content-new-20-percent-rule/>>, Accessed Sep. 16, 2018 (Year: 2013).*

International Search Report and Written Opinion for International Application PCT/US2014/032669, dated Aug. 26, 2014.

European Patent Office, Search Report for Patent Application No. 14783229.9, dated Sep. 9, 2016.

Japan Patent Office, Notification of Reasons for Rejection for Patent Application No. 2016-507563 (with English translation), dated Mar. 27, 2018.

Yasuhiro Kunishige et al., "Character Detection from Scenery Images Using Scene Context", IEICE Technical Report, the Institute of Electronics, Information and Communication Engineers, vol. 109, No. 418, pp. 81-86, Feb. 11, 2010.

Impress Corporation, "What is the new rule of Facebook advertisement '20% rule'!?", <URL: https://webtan.impress.co.jp/e/2013/03/04/14751>, Mar. 6, 2013.

The State Intellectual Property Office of the People's Republic of China, Notification of the First Office Action and Search Report for Patent Application No. 201480033674X (with English translation), dated Jan. 10, 2018.

European Patent Office, Communication pursuant to Article 94(3) EPC, dated Mar. 12, 2018.

AU Office Action received for Patent Application No. 2014251221, dated Oct. 29, 2018.

AU Office Action received for Patent Application No. 2014251221, dated Nov. 7, 2018.

MX Office Action received for Patent Application No. MX/a/2015/014302. (with English Translation), dated Jul. 23, 2018.

IL Office Action received for Patent Application No. 241903. (with English Translation), dated Jul. 19, 2018.

CN Office Action received for Patent Application No. 201480033674X. (with English Translation), dated Sep. 7, 2018.

* cited by examiner

IDENTIFYING CONTENT IN ELECTRONIC IMAGES

TECHNICAL FIELD

This disclosure generally relates to electronic image analysis.

BACKGROUND

Electronic images are presented as surfaces having graphical content. Electronic images may be stored in any suitable electronic storage medium, such as a harddrive, flash drive, etc and may be stored according to any suitable format, such as JPEG, TIFF, GIF, etc.. Electronic images may be presented to a viewer using any suitable display, such as on a display on a personal computer, mobile device, touchscreen, kiosk, television screen, etc. Electronic images may have variable characteristics such as size, shape, resolution, color schemes used, etc, and those characteristics may be varied for presentation on different types of displays or in different contexts, windows, etc. on a single display.

SUMMARY OF PARTICULAR EMBODIMENTS

An electronic image, such as an advertisement, may contain a type of graphics such as text, shapes, etc. An example method may access the electronic image and divide the image into a number of surfaces. The surfaces may have any suitable shape or size. A determination is made about whether the type of graphics is present on one or more of the surfaces. For example, the determination may be made by any suitable image processing technique or based on input received from a user. A percentage of the image's total surface area occupied by the surfaces determined to contain the type of graphics is calculated. In particular embodiments, if that percentage exceeds a predetermined percentage, the type of graphics may be resized, rearranged, or removed such that the total surface area occupied by the surfaces containing the type of graphics is less than the predetermined percentage.

DESCRIPTION OF EXAMPLE EMBODIMENTS

Figure 1:
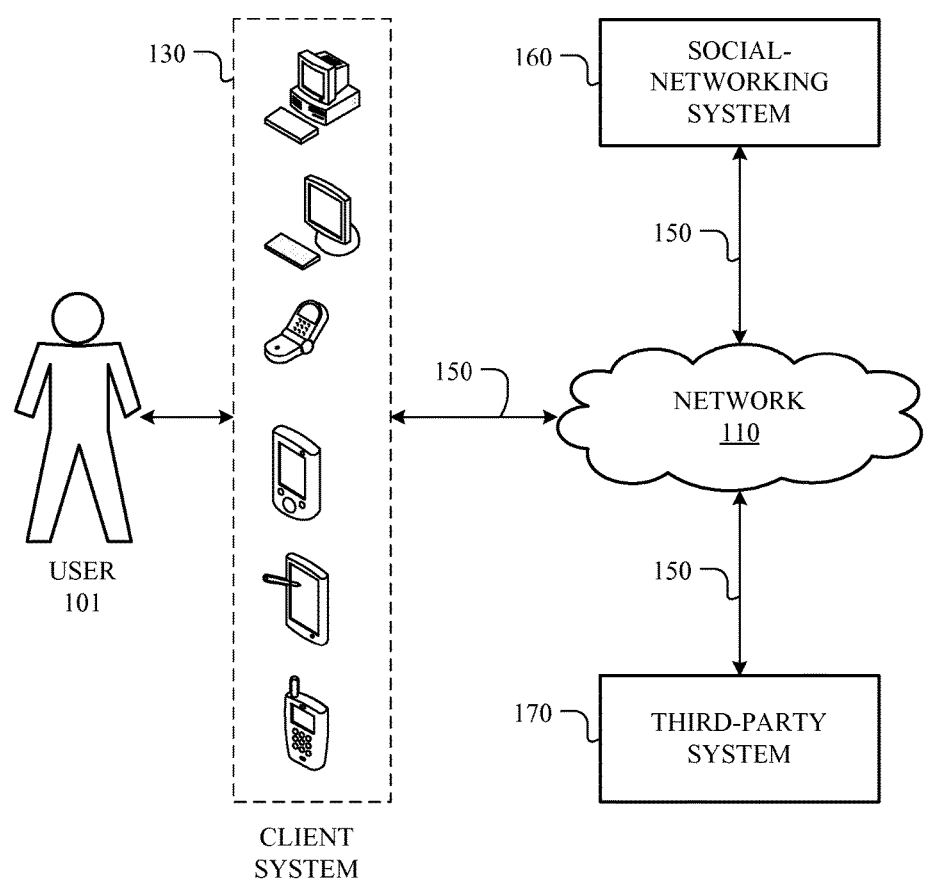
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 160 through blocking, data hashing, anonymization, or other suitable techniques as appropriate. Third-party system 170 may generate, store, receive, and send data, such as, for example, an advertisement. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a graphical user interface ("GUI") of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

Figure 2:
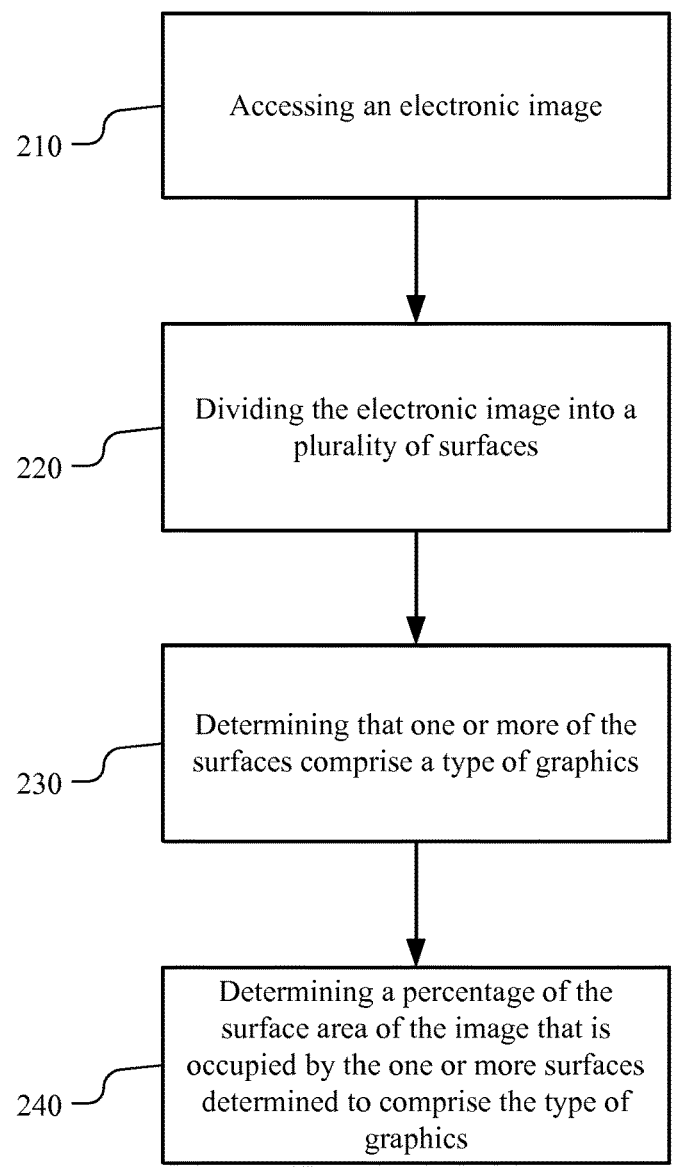
FIG. 2 illustrates an example method for determining the percentage of an electronic image occupied by a type of graphics.

FIG. 2 illustrates an example method 200 for determining the percentage of an electronic image occupied by a type of graphics. The method may begin at step 210, where an electronic image is accessed. Electronic images may be accessed from any suitable non-volatile storage medium, such as a harddrive, flash drive, read-only memory ("ROM"), etc. Electronic images may accessed from any suitable volatile storage media, such as random-access memory ("RAM"), caches, buffers, etc. In particular embodiments, surfaces may be represented by identifying the memory elements describing the portion of an image the surface comprises. Electronic images may be stored according to any suitable format, such as JPEG, TIFF, GIF, PNG, etc. Electronic images may be of any suitable type, such as photos or advertisements, and may include any suitable graphical content such as text, colors, shapes, etc.

At step 220, the electronic image is divided into a plurality of surfaces. The surfaces (and thus, the divisions) may take any suitable shape and be of any suitable size. In particular embodiments, the surfaces may be non-overlapping and/or may collectively span the surface area of the image. For example, the surfaces may be squares, rectangles, hexagons, polygons, ellipses, or any suitable combination thereof. In particular embodiments, the surfaces and corresponding divisions may be presented as divided to a user. For example, the divisions may be represented as a grid (e.g. by lines or other suitable markings), and the grid and surfaces may be presented to the user. In particular embodiments, one surface of an image may have a different size or shape than another surface of the image. In particular embodiments, divisions or the size, shape, or locations of one or more surfaces may be determined by identifying or estimating the presence of particular content or types of graphics in the image, as explained more fully below. This disclosure contemplates dividing an image into any suitable type, number, or size of surfaces, and representing those surfaces and/or divisions in any suitable way.

At step 230, a determination is made whether a type of graphics exists on at least one of the surfaces. This disclosure contemplates any suitable type of graphics, such as text, colors, shapes, etc. In particular embodiments, the determination may be made based on input received from a user. For example, the surfaces may be presented to the user and the user may indicate (e.g. by clicking using a cursor, dragging using a cursor, touching on a touch-sensitive portion of the display, etc.) which surfaces contain a type of graphics. In particular embodiments, the number and size of surfaces may be such that the user can make provide input quickly or within a predetermined amount of time, for example by using a uniform grid of rectangles each having a height and width of at least one inch or by using a uniform grid of a predetermined number of squares, such as a 5×5 grid. In particular embodiments, the determination may be made by a computing device, for example by using one or more image-processing techniques, such as optical character recognition (OCR) or line recognition for text, or techniques (such as Fourier transforms) for identifying shapes, patterns, etc, or characteristics of the same. In particular embodiments, a determination may be made by a combination of user input and a computing device. For example, a user's determination of which surfaces contain a type of graphics may be checked by image processing techniques, and vice versa. In particular embodiments, the divisions described above may be altered by or based on estimates of which portions of an image contain a type of graphics. As an example, a user may identify where a type of graphics is present or identify regions containing the type of graphics, and that identification may be used to determine the size, shape, or location of one or more surfaces. For example, a surface may be enlarged or made smaller to more-accurately represent the shape or location of at least part of the particular type of graphics, such as by closely matching a surface to the area occupied by the type of graphics. As another example, a computing device may estimate where a type of graphics is present, for example by using image-processing techniques as described above, and those estimates may be used to determine the size, shape, or location of one or more surfaces. As another example, portions of an image where a type of graphics is likely to occur (e.g. based on analysis of similar images) may have pre-sized and/or pre-shaped surfaces. This disclosure contemplates determining that one or more surfaces comprise a type of graphics by any suitable technique.

At step 240, the percentage of the image's surface area occupied by surfaces determined to include the type of graphics is calculated. This disclosure contemplates any suitable method of calculating the percentage, such as adding the surface areas of the surfaces and dividing by the surface area of the image, by adding each surface area of a surface divided by the surface area of the image, dividing the number of surfaces containing the type of graphics by the total number of surfaces the image is divided into (if the surfaces are of uniform surface area), etc. In particular embodiments, the percentage may be compared to a predetermined percentage, and some action may be taken as a result. As an example, the image may be an advertisement and the type of graphics may be text. If the surface area of surfaces containing text is a greater percentage of the advertisement's surface area than a pre-determined percentage, the advertisement may be prohibited from being displayed, and the advertiser or publisher may be notified that the advertisement does not comply with rules governing the area of an advertisement text is permitted to cover. In addition or the alternative, if the surface area of surfaces containing text is a greater percentage of the advertisement's surface area than a pre-determined percentage, at least some of the text may be rearranged, resized, and/or removed. For example, the text may iteratively rearranged, resized, and/or removed until the surface area of surfaces containing text is not a greater percentage of the advertisement's surface area than a pre-determined percentage, or a calculation may be made regarding one or more configurations of text that would result in the surface area of surfaces containing text to not be a greater percentage of the advertisement's surface area than a predetermined percentage, and the text may be configured to one of the calculated configurations. As another example, a user may select all or a portion of the text and indicate a size, shape, or location of the text or a size, shape, or location of one or more surfaces to move the text onto. While this disclosure describes particular embodiments in the context of text on advertisements, this disclosure applies to any suitable type of graphics on any suitable type of electronic image.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

In particular embodiments, a determination (whether automated, based on manual input, or some combination thereof) about whether a surface contains a type of graphics may be used to train automated methods used to determine or aid in a determination of whether a surface contains a type of graphics. For example, a determination may be used to train one or more image-processing tools such as OCR, line detection, etc. In particular embodiments, machine-learning techniques such as decision trees, neural networks, clustering, reinforcement learning, etc. may be used to facilitate the training process.

Figure 3:
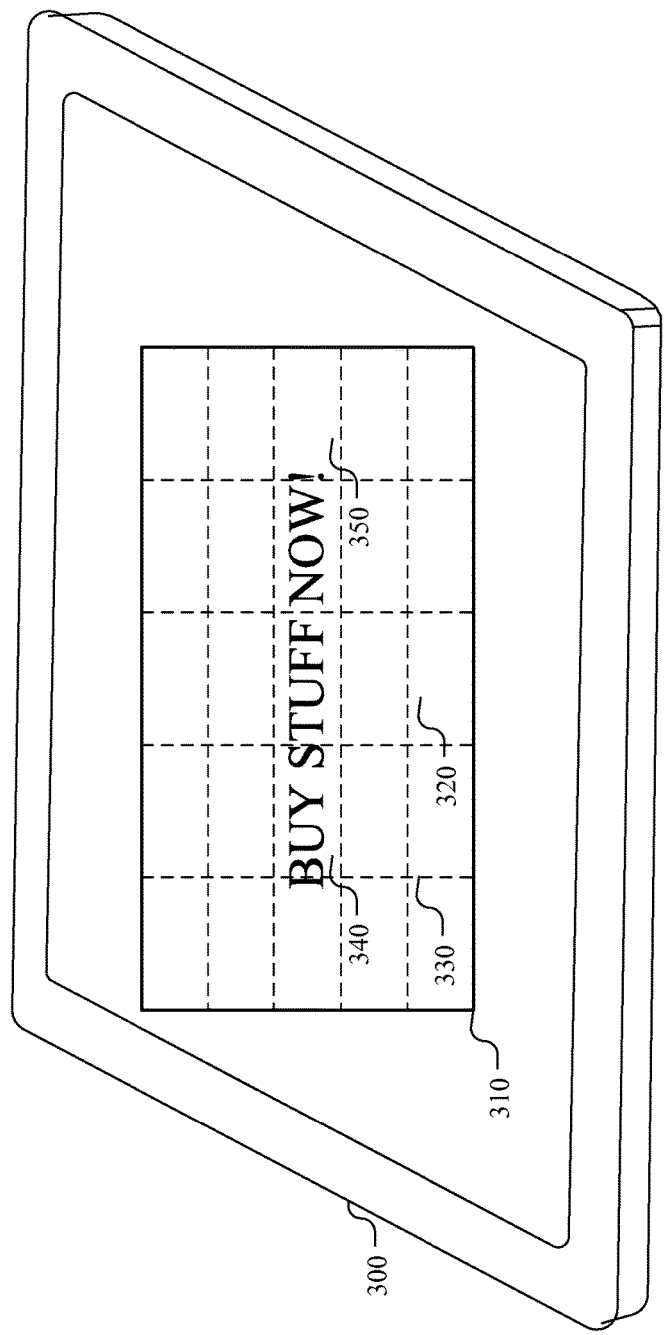
FIG. 3 illustrates an example of determining the percentage of an electronic advertisement occupied by text.

FIG. 3 illustrates a specific example for determining the percentage of an electronic advertisement occupied by text (as described more fully in step 230, above). As illustrated, device 300 displays an advertisement 310 on a display. The advertisement is divided into a 5×5 grid of rectangular surfaces including, for example, rectangular surfaces 320, 340, and 350, and the divisions are indicated by gridlines 330. The user selects the rectangular surfaces where text appears, such as rectangular surface 340. The user may select the rectangular surfaces by any suitable method, such as by using a cursor, tapping the squares on a touch-sensitive display, swiping the squares on a touch-sensitive display, etc. In particular embodiments, selected surfaces may be presented differently than unselected surfaces, for example by shading the selected surfaces, coloring the selected surfaces, etc. As illustrated by the example of FIG. 3, in particular embodiments a type of graphics may be determined not to be a on a surface if only a small amount of the type of graphics is on the surface or the type of graphics occupies only a small amount of surface area of the surface. For example, surface 350 contains a small portion of text, and the user may not indicate that the surface contains text.

Figure 4:
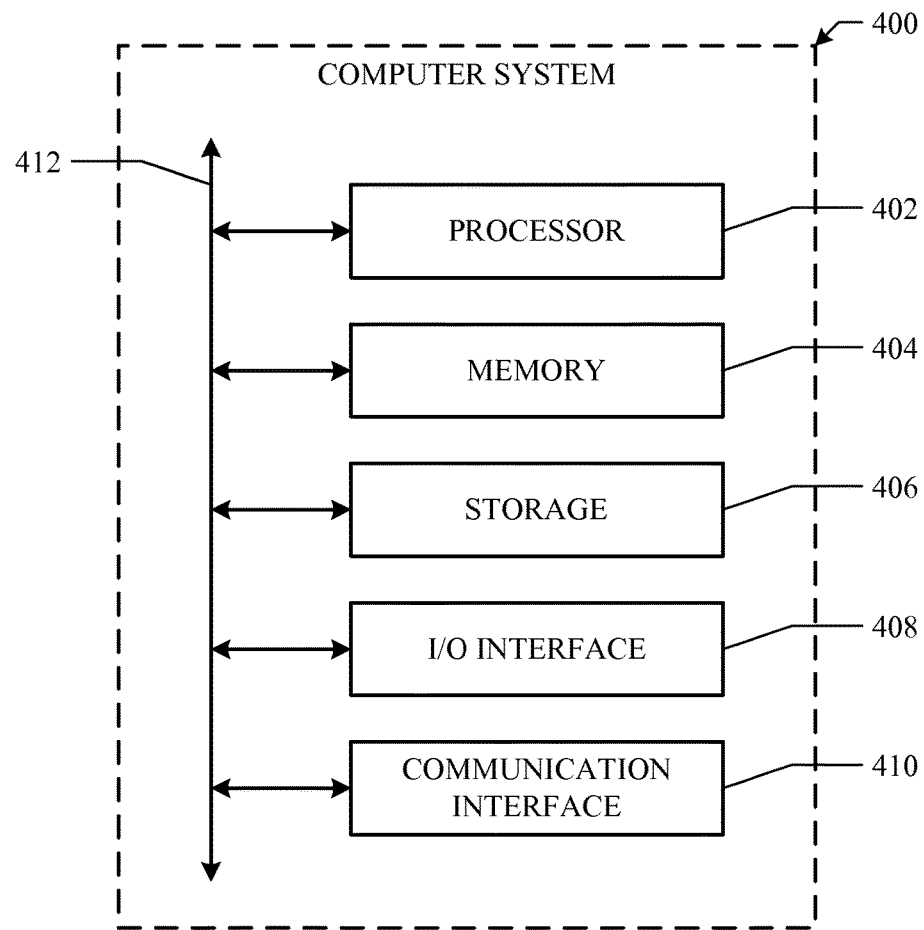
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SB) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
    receiving an indication from an advertiser that the advertiser would like to promote a social action posted to a social-networking system by a user;
    accessing an electronic image comprising a surface area, wherein the image is associated with the social action and, by virtue of the indication from the advertiser, is now treated as an advertisement to display to other users of the social-networking system;
    dividing the electronic image into a plurality of surfaces;
    determining that one or more of the surfaces comprise text;
    automatically determining that a first percentage of the surface area of the image that is occupied by the one or more surfaces comprising text is greater than a threshold;
    in response to determining that the first percentage of the surface area of the image exceeds the threshold:
        preventing display of the advertisement to the other users of the social-networking system; and
        determining, by rearranging, resizing, or removing the text, a new configuration for the plurality of surfaces of the image in which a second percentage of the surface area of the image is occupied by the one or more surfaces comprising text, wherein the second percentage is less than the threshold; and
    displaying the new configuration for the plurality of surfaces as the advertisement to the other users of the social-networking system.

2. The method of claim 1, wherein determining that one or more of the surfaces comprise text comprises:
    displaying the divided electronic image to an administrator; and
    receiving input from the administrator indicating that the one or more of the surfaces comprise text.

3. The method of claim 1, further comprising:
provide determination that one or more of the surfaces comprise text as training input to an image-processing algorithm.

4. The method of claim 1, wherein determining that one or more of the surfaces comprises text comprises:
determining an amount of text that occupies one of the one or more surfaces;
determining that the amount of text is greater than a predetermined amount; and
when the amount of text is greater than the predetermined amount, determining that the one of the one or more surfaces comprises text.

5. The method of claim 1, further comprising:
adjusting size or location of at least some of the text when the first percentage of the surface area of the image that is occupied by the one or more surfaces comprising text exceeds the threshold.

6. The method of claim 1, wherein at least one of the plurality of surfaces has a different size or shape than at least another one of the plurality of surfaces.

7. The method of claim 1, wherein a size or shape of at least one of the plurality of surfaces is determined based on an estimate of a size or shape of at least part of the text.

8. One or more computer-readable non-transitory storage media embodying software that is operable when executed to:
receive an indication from an advertiser that the advertiser would like to promote a social action posted to a social-networking system by a user;
access an electronic image comprising a surface area, wherein the image is associated with the social action and, by virtue of the indication from the advertiser, is now treated as an advertisement to display to other users of the social-networking system;
divide the electronic image into a plurality of surfaces;
determine that one or more of the surfaces comprise text;
automatically determine that a first percentage of the surface area of the image that is occupied by the one or more surfaces comprising text is greater than a threshold;
in response to determining that the first percentage of the surface area of the image exceeds the threshold:
prevent display of the advertisement to the other users of the social-networking system when the first percentage of the surface area of the image exceeds the threshold; and
determine, by rearranging, resizing, or removing the text, a new configuration for the plurality of surfaces of the image in which a second percentage of the surface area of the image is occupied by the one or more surfaces comprising text, wherein the second percentage is less than the threshold; and
display the new configuration for the plurality of surfaces as the advertisement to the other users of the social-networking system.

9. The media of claim 8, wherein the software that is operable when executed to determine that one or more of the surfaces comprise a type of graphics comprises software that is operable when executed to:
display the divided electronic image to an administrator; and
receive input from the administrator indicating that the one or more of the surfaces comprise text.

10. The media of claim 8, wherein the software is further operable when executed to:
provide the determination that one or more of the surfaces comprise text as training input to an image-processing algorithm.

11. The media of claim 8, wherein the software that is operable when executed to determine that one or more of the surfaces comprise text comprises software that is operable when executed to:
determining an amount of text that occupies one of the one or more surfaces;
determine that the amount of text is greater than a predetermined amount; and
when the amount of text is greater than the predetermined amount, determine that the one of the one or more surfaces comprises text.

12. A system comprising:
one or more processors; and
a memory coupled to the processors comprising instructions executable by the processors, the processors being operable when executing the instructions to:
receive an indication from an advertiser that the advertiser would like to promote a social action posted to a social-networking system by a user;
access an electronic image comprising a surface area, wherein the image is associated with the social action and, by virtue of the indication from the advertiser, is now treated as an advertisement to display to other users of the social-networking system;
divide the electronic image into a plurality of surfaces;
determine that one or more of the surfaces comprise text;
automatically determine that a first percentage of the surface area of the image that is occupied by the one or more surfaces comprising text is greater than a threshold;
in response to determining that the first percentage of the surface area of the image exceeds the threshold:
prevent display of the advertisement to the other users of the social-networking system when the first percentage of the surface area of the image exceeds the threshold; and
determine, by rearranging, resizing, or removing the text, a new configuration for the plurality of surfaces of the image in which a second percentage of the surface area of the image is occupied by the one or more surfaces comprising text, wherein the second percentage is less than the threshold; and
display the new configuration for the plurality of surfaces as the advertisement to the other users of the social-networking system.

13. The system of claim 12, wherein determining that one or more of the surfaces comprise a type of graphics comprises:
displaying the divided electronic image to an administrator; and
receiving input from the administrator indicating that the one or more of the surfaces comprise text.

14. The system of claim 12, wherein the processors are further operable to:
provide the determination that one or more of the surfaces comprise text as training input to an image-processing algorithm.

15. The system of claim 12, wherein the processors are further operable to:
determine an amount of text that occupies one of the one or more surfaces;
determine that the amount of text is greater than a predetermined amount; and when the amount of text is greater than the predetermined amount, determine that the one of the one or more surfaces comprises text.

\* \* \* \* \*